United States Patent [19]

Rochkind

[11] Patent Number: 5,848,130
[45] Date of Patent: Dec. 8, 1998

[54] SYSTEM AND METHOD FOR ENHANCED INTELLIGIBILITY OF VOICE MESSAGES

[75] Inventor: Mark Meier Rochkind, Morristown, N.J.

[73] Assignee: AT&T Corp, Middletown, N.J.

[21] Appl. No.: 777,833

[22] Filed: Dec. 31, 1996

[51] Int. Cl.⁶ .................................................. H04M 1/64
[52] U.S. Cl. ..................... 379/67; 379/67.1; 379/88.02; 379/88.04; 379/88.12; 379/88.22
[58] Field of Search ................................. 379/67, 88, 89, 379/67.1, 88.01, 88.02, 88.04, 88.12, 88.22

[56] References Cited

U.S. PATENT DOCUMENTS

| | | | |
|---|---|---|---|
| 3,786,195 | 1/1974 | Schiffman | 704/211 |
| 4,757,525 | 7/1988 | Matthews et al. | 379/89 |
| 4,783,804 | 11/1988 | Juang et al. | 704/245 |
| 5,027,384 | 6/1991 | Morganstein | 379/89 |
| 5,384,831 | 1/1995 | Creswell et al. | 379/67 |
| 5,386,493 | 1/1995 | Degen et al. | 704/267 |
| 5,475,791 | 12/1995 | Schalk et al. | 704/233 |
| 5,483,578 | 1/1996 | Ackermann et al. | 379/67 |
| 5,493,608 | 2/1996 | O'Sullivan | 379/88 |
| 5,509,104 | 4/1996 | Lee et al. | 704/256 |
| 5,524,137 | 6/1996 | Rhee | 379/67 |

Primary Examiner—Fan S. Tsang
Assistant Examiner—Allan Hoosain

[57] ABSTRACT

A system and method is provided for playing back a recorded voice message, and, in particular, for automatically playing back a spoken numeric portion of the message at a rate that is slower than the rate for playing back the remaining portion of the recorded voice message. A voice messaging system receives and analyzes the voice message. Specifically, the messaging system determines whether the voice message includes spoken numeric information and, if so, determines the relative position of the spoken numeric information within the message. The computer system stores both the voice message and the positional information in a storage device. Upon playback of the message, the messaging system retrieves the stored voice message and positional information from the storage device. As the voice message is played back, the messaging system processes the positional information. When the positional information indicates that a particular portion of a voice message includes spoken numeric information, that particular portion is played back at a decreased speed.

7 Claims, 6 Drawing Sheets

410 → This is an example of a message that includes a spoken number one-eight-hundred-five-five-five-one-two-one-two 420 → 000000000000000000000000000000000000000000000000011111111111111111111111111111111111111 ← 420

SYSTEM AND METHOD FOR ENHANCED INTELLIGIBILITY OF VOICE MESSAGES

FIELD OF INVENTION

The present invention is directed to a system and method for enhanced intelligibility of a voice message. More particularly, the present invention relates to the playback of spoken numeric information at a rate that is slower than the playback of the remainder of the voice message.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

Voice messaging systems are commonplace today. Many businesses have private voice-mail systems incorporated into their local telephone network. Additionally, many households have telephone answering machines. Even telephone companies offer voice messaging services.

Today's voice messaging systems offer users a variety of playback options. Users can back up the message a few seconds or advance the message a few seconds. Users can also increase the speed of the playback. At faster speeds, messages can be reviewed at a greater rate, thereby increasing efficiency. While most of a particular message will normally be intelligible at increased playback speed such as, for example, 1.75 times normal speed, certain portions of the message may be unintelligible at that speed. Numeric information may be particularly difficult to understand at an increased speed. Even at normal speeds, numeric information unfamiliar to the listener may be difficult to understand.

One reason for the unintelligibility of numeric data is that many people tend to rapidly recite familiar numbers such as telephone numbers. For example, when recording a message, many people speak slowly while formulating their sentences. However, when these same people recite a telephone number familiar to them, their speaking speed increases. Accordingly, when the message is played back, the listener may have difficulty comprehending the numeric information and may be required to replay the message several times before they adequately comprehend the details of the entire message. Even if a listener can understand the information the first time it is played back, the listener may be writing the number down, thus may need the numeric information to be played back at a slower speed.

Existing voice messaging systems provide users with the capability of increasing and/or decreasing the speed of the playback of a message. One such system is described in U.S. Pat. No. 5,386,493 issued to Degen et al. entitled "Apparatus And Method For Playing Back Audio At Faster Or Slower Rates Without Pitch Distortion", expressly incorporated herein by reference. In such systems, however, the entire message is played back at the selected playback rate. Thus, if the listener wants to slow down the playback of a telephone number, the entire message is slowed down. By manual control, a user might speed up and slow down a message as it is played back.

SUMMARY OF THE INVENTION

The present invention is a system and method for playing back a recorded voice message, and, in particular, for playing back a spoken numeric portion of the message automatically at a rate that is slower than the rate for playing back the remaining portion of the recorded voice message. A voice messaging system receives and analyzes the voice message. Specifically, the messaging system determines whether the voice message includes spoken numeric information and, if so, determines the relative position of the spoken numeric information within the message. The messaging system stores both the voice message and the positional information in a storage device.

Upon playback of the message, the computer system retrieves the stored voice message and positional information from the storage device. As the voice message is played back, the computer system processes the positional information. When the positional information indicates that a particular portion of a voice message includes spoken numeric information, that particular portion is played back at a decreased speed.

The method for determining the positional information is included as part of this invention.

DETAILED DESCRIPTION

Figure 1:
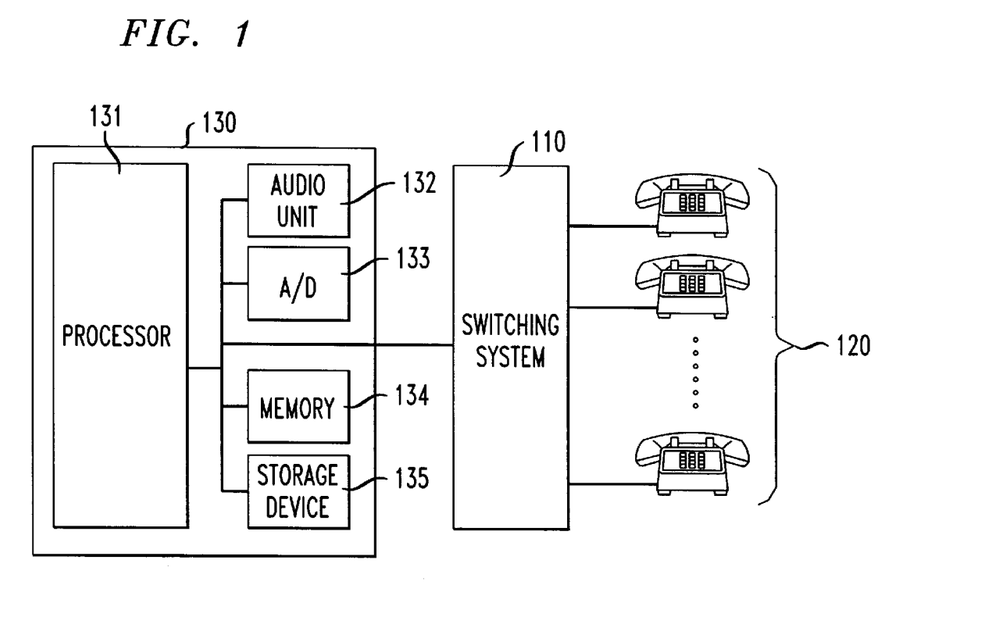
FIG. 1 is a system diagram of an exemplary embodiment of the present invention.

Referring now to the drawings, and initially FIG. 1, there is illustrated a system diagram of an exemplary embodiment of the present invention. A telephone switching system 110 selectively establishes communication connections between call stations 120, (e.g., telephones, computer workstations, facsimile machines), and between call stations and a voice messaging system 130. A call station 120 is connected to the voice messaging system 130 as the result of, for example, i) the call station 120 directly dialing a telephone number of the messaging system 130, or ii) the call station 120 failing to establish a connection with another call station served by the messaging system 130 (for example, the other call station may be busy, or the other call station does not go "off-hook," i.e., it is not answered, within a predetermined amount of time). The switching system 110 may be, for example, a public branch exchange, a telephone switching office (central office, end office), or a local business telephone system, and is generally well known in the prior art.

In an exemplary embodiment, the messaging system 130 is comprised of a processor 131 in communication with an audio unit 132 (for generating audio signals to callers under the control of the processor 131), an analog to digital (A/D) convertor 133, a dynamic memory 134 (e.g., RAM), and a storage device 135 such as, for example, a disk array.

Figure 2:
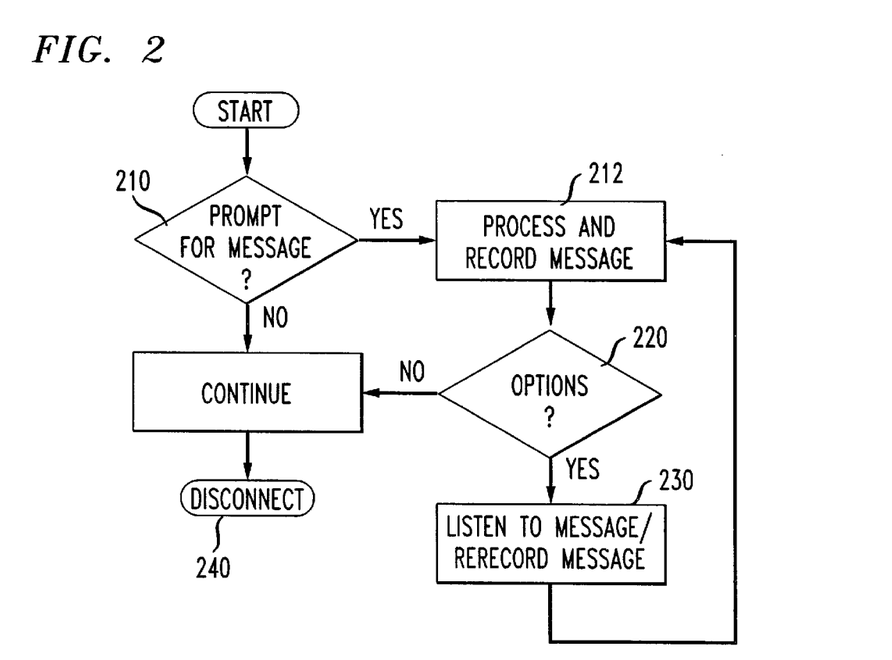
FIG. 2A is a flowchart of the overall logic flow of the exemplary embodiment in which a caller leaves a message for a called party.
FIG. 2B is a flowchart of the overall logic flow of an exemplary embodiment in which a user accesses her mailbox.

Referring now to the flowchart of FIG. 2A, we describe the overall logic flow of an exemplary embodiment where a caller leaves a message for a called party whose telephone device is either busy or goes unanswered. The art by which a messaging system connects a caller, who has been redirected to the messaging system by the busy or ring-no-answer condition, with the voice mailbox of the called party is well known.

Upon connecting a call station 120 to the messaging system 130 (in particular, the called party's voice mailbox), the messaging system 130 plays a recorded prompt (through audio unit 132) to the call station 120, inviting the caller to record a message for a particular user (step 210). The caller responds by speaking a message into a telephone mouthpiece at the call station 120. The caller who leaves a message may include in the message the telephone number of the caller so that the person for whom the message is left may return the call. The messaging system 130 processes the message as it is input and records the message on a storage device 135 (step 212). In particular, the message is stored as "mail" in the called party's mailbox. The caller may then listen to the message, rerecord the message (step 230) or disconnect from the messaging system (step 240).

Figure 2B:
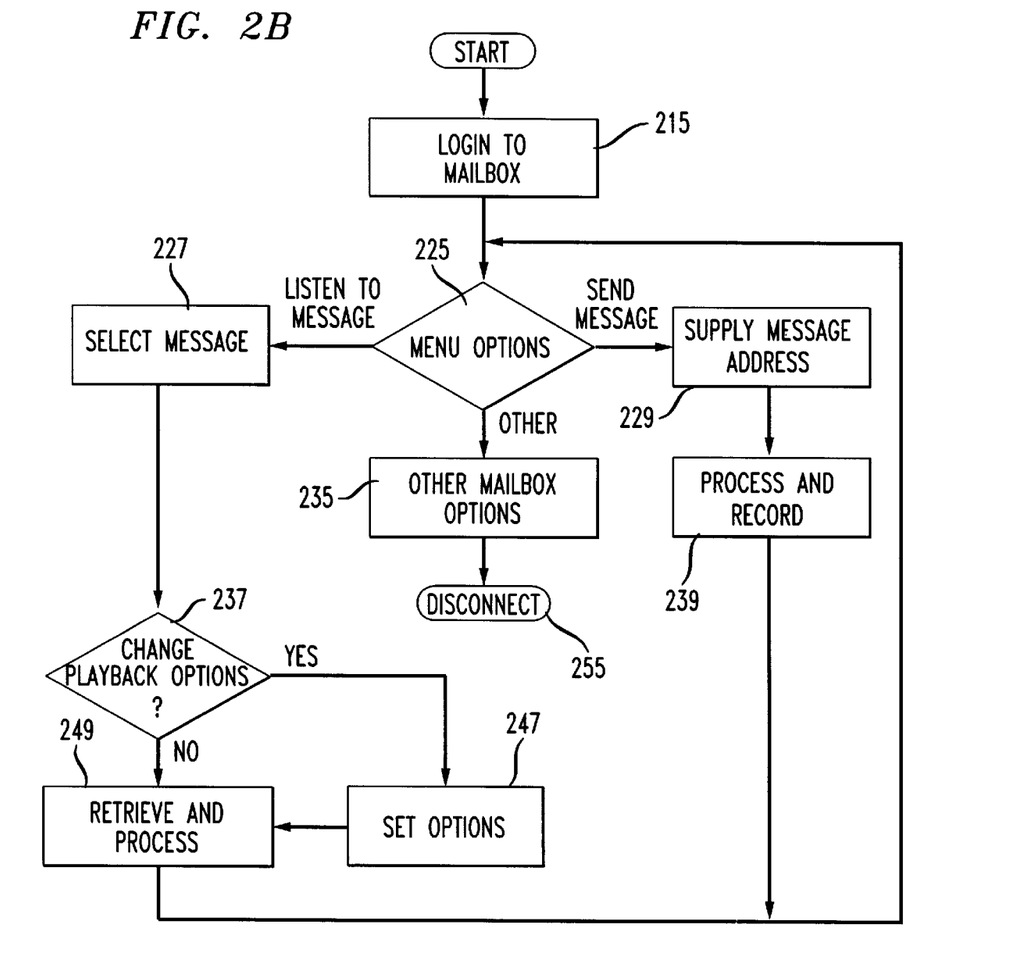

In the flowchart of FIG. 2B, the overall logic of an exemplary embodiment is illustrated where a user accesses his or her mailbox for the purpose of sending or retrieving messages. In this instance, the user phones the messaging system 130 to connect the user's call station 120 to the messaging system 130. The messaging system first executes a login sequence (step 215) whereby the user identifies himself or herself to the system. The user is then offered a menu of options (step 225). The user may elect to send a message (steps 220 and 239), to listen to recorded messages left or sent by others (steps 227, 237, 247, and 249), or to engage in the execution of other mailbox options such as personalization (step 235). In lieu of executing any options or after engaging in selected options, the user may disconnect (step 255).

If the user elects to send a message, the messaging system prompts the user for the address(es) to which the message will be sent (step 229) and then prompts the user to speak the message to be sent. The message is processed and recorded (step 239). The user may then engage in any of the menu options offered (step 225).

If the user elects to listen to messages left or sent by others, the user selects from the inventory of messages stored (step 227) and may optionally elect playback options such as speed up or slow down which governs the playback (steps 237 and 247). After setting playback options or in lieu of doing so, the messaging system retrieves the selected message and processes it for playback (step 249).

If the user elects to set playback options such as the speed at which the user's messages are played back (step 249), the messaging system sets options according to the user's preferences (step 247).

Figure 3:
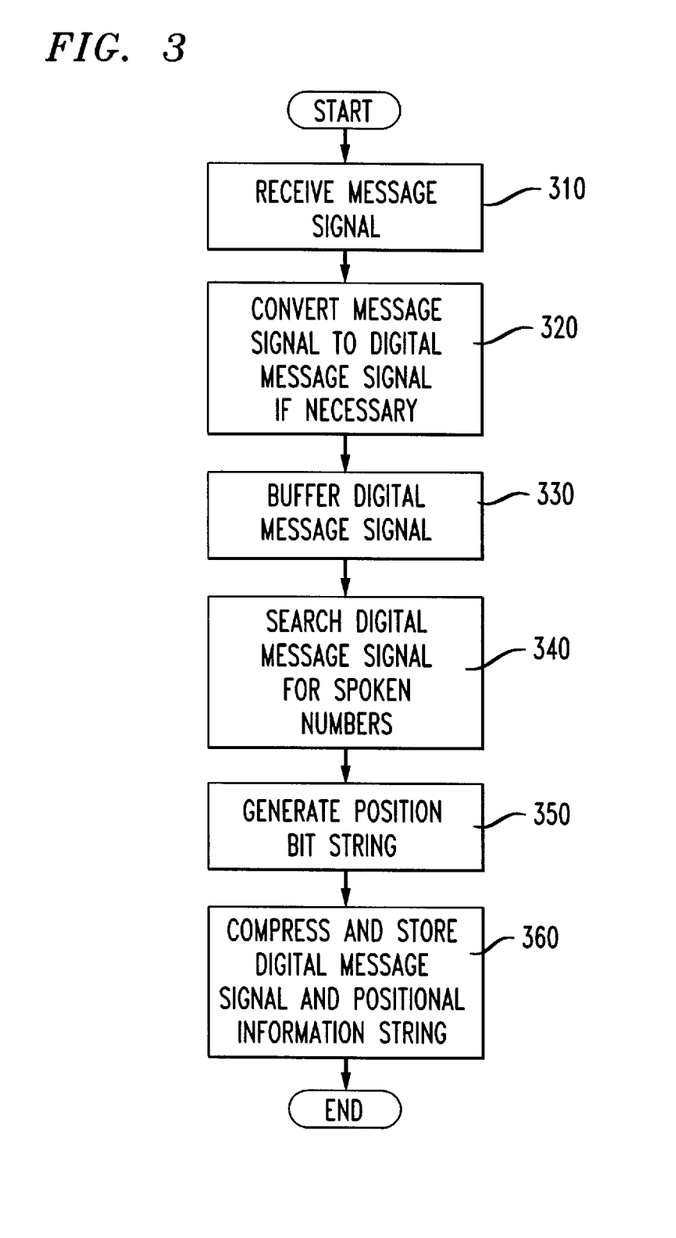
FIG. 3 is a flowchart of the processing and recording step of FIGS. 2A and 2B.

Recording: The flowchart of FIG. 3 shows the processing and recording step (212 or 239) in more detail. The messaging system 110 receives the caller's voice message in the form of a message signal. The message signal is converted to a digital signal comprised of audio samples by the A/D converter 133 if the signal is not already in a digital form (step 320) and is then stored in a buffer (step 330). The buffer may be located in the dynamic memory 134, on storage device 135, or in a combination of both.

The messaging system 130 then analyzes the voice message for spoken numeric information. Specifically, the system 130 determines whether spoken numbers (such as, for example, connected digits) are within the voice message, and, if so, determines the relative position of the spoken numbers within the voice message. In the exemplary embodiment, the system 130 searches the message for spoken numbers such as spoken connected single digit numbers, multi-digit numbers, and combinations of both (step 340). Spoken connected digits include, for example, "one-two-three." Spoken multi-digit numbers include "thirteen," and "hundred." A combination would include, for example, "one-eight-hundred," and "twenty-seven." In an alternative embodiment, the system 130 could also search for spoken single digit numbers at the expense of an increased error rate. For example, the system 130 may have difficulty distinguishing between homophones such as "two," "to," and "too," "four" and "for," or "eight" and "ate." When the processor 131 within the messaging system 130 is sufficiently fast, it may not be necessary to buffer the digital message signal (step 330). In such a case, step 340 might follow directly from step 320.

The analysis of the voice message can be accomplished using any one of a variety of speech recognition and pattern recognition techniques. For example, stored templates comprised of voice signal samples of spoken numbers could be compared to portions of the voice message, a match indicating the presence of a spoken number within the voice message. Other techniques are described in U.S. Pat. No. 5,509,104 issued to Lee et al. entitled "Speech Recognition Employing Key Word Modeling and Non-Key Work Modeling," and U.S. Pat. No. 4,783,804 issued to Juang et al. entitled "Hidden Markov Model Speech Recognition Arrangement," both expressly incorporated herein by reference.

For each audio sample that includes at least a portion of a spoken number, the messaging system associates a "1" with that sample. Note that since an entire spoken number is generally at least several audio samples long, a string of several consecutive ones will be associated with that spoken number. For each of the other audio samples, the system will associate a "0." Accordingly, a bit string of zeroes ("0") and ones ("1"), i.e., a position bit string (or signal), is associated with each message processed (step 350). In an alternate embodiment, a "0" could be associated with the sample including at least a portion of the spoken number while a "1" could be associated with the remaining audio samples. Furthermore, a single bit could be associated with a plurality of audio samples.

Once the entire message is processed, both the digital message signal and the associated position string are compressed and then stored in an appropriate location (mailbox) on the storage device 135 (step 360). In the exemplary embodiment, messages are compressed before they are stored because of economies which it produces.

When the user is a caller wanting to leave a voice message for a called party whose telephone device is either busy or unanswered, the mailbox is the mailbox of the called party. When the user is a caller who wishes to send a voice message to another party, the mailbox is the mailbox of the caller. Alternatively, the message signal and position bit string may be stored in a general purpose database along with the telephone number (mailbox number) so that they may be retrieved by providing the appropriate telephone number (mailbox number) to the database management system.

In an alternative embodiment, the positional information may simply comprise the relative starting and ending positions of the numeric information within the message in terms of numbers of audio samples (e.g., start1=sample 12000, end1=sample 16000, start2=sample 30000, end2=sample 30300), or in terms of relative time (e.g., start1 =32.2 sec., end1=40.5 sec).

Figure 4:
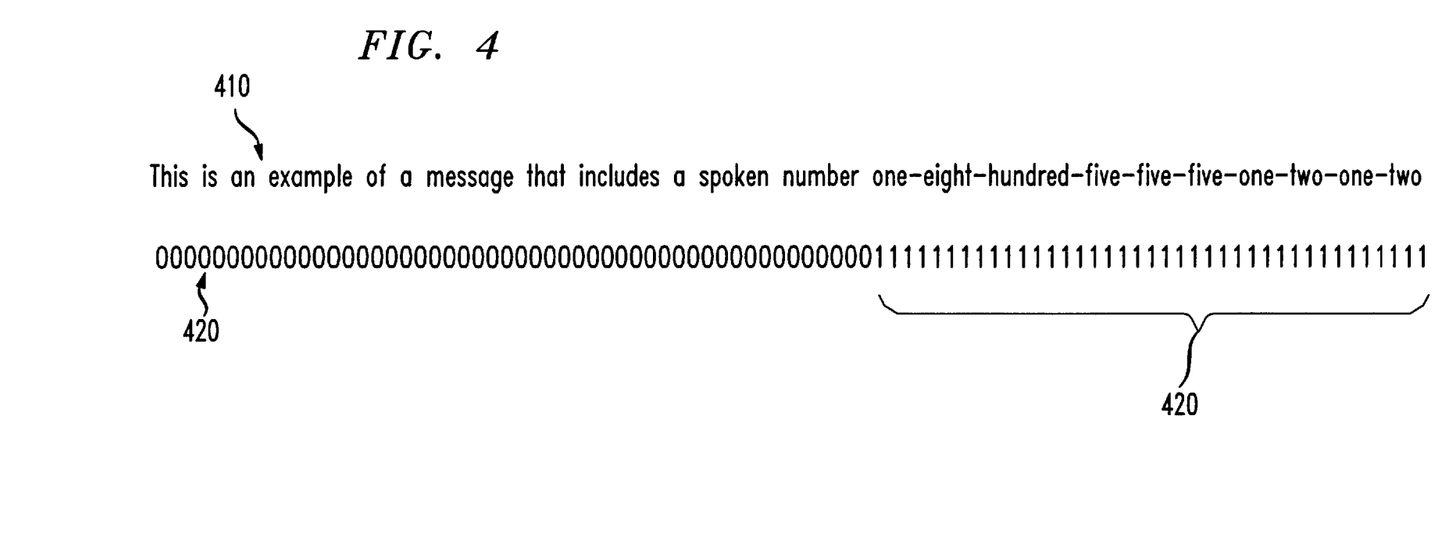
FIG. 4 illustrates an exemplary message and corresponding position bit string.

FIG. 4 shows the text of a sample message 410 and a corresponding position bit string 420. The position bit string 420 includes a substring of ones (430) corresponding to audio samples that include at least a portion of a spoken number.

Figure 5:
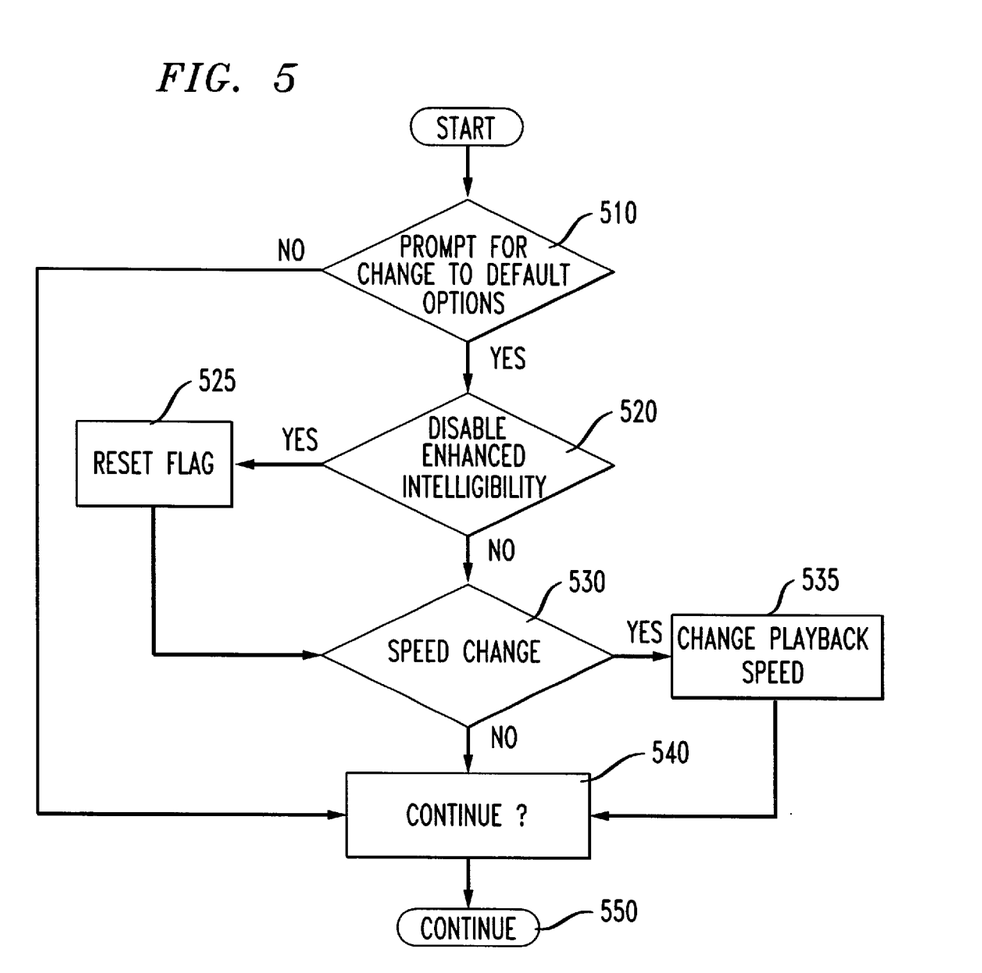
FIG. 5 is a flowchart of the options setting step of FIG. 2B.

Options Setting: The flowchart of FIG. 5 provides details of the options setting step 247 of FIG. 2B. In the exemplary embodiment of the present invention, the user is permitted to set two options. Specifically, the user may enable or disable "enhanced intelligibility mode," and the user may also set the playback speed of messages (e.g., 1.25×normal, 1.5×normal, 1.75×normal, etc.). Upon enabling "enhanced intelligibility mode," any spoken numbers detected in messages played back to the user thereafter will automatically be played back at a slower rate than the rest of the message. The default settings are "enhanced intelligibility mode" enabled and message playback speed is set to "1," i.e., 1×(times) normal speed. Even when the playback speed is set to 1×normal, "enhanced intelligibility mode" will cause embedded connected digit and number strings to be played back at a slower rate, such as, for example, 0.75×normal. For rotary phones in the exemplary embodiment, the default options are always active.

In an exemplary embodiment of the present invention, the messaging system 130 prompts the user to change the default options (step 510). If the user elects to change the default options by indicating "yes" in response to the prompt in step 510, the messaging system 130 will prompt the user to disable "enhanced intelligibility mode." If the user chooses to do so, a flag will be appropriately reset (step 525) and the messaging system will prompt for a playback speed change (step 530). The user may elect to modify the playback speed or not. If not, the user goes on to step 540 and exits the options processing via step 550. If the user chooses to modify the playback speed, this is accomplished in step 535. Once changed to, for example, 1.5×normal or 0.75× normal, the playback speed remains at this adjusted speed for the remainder of the session or until the speed is changed once again. The user then proceeds through step 540 and exits the options processing via step 550.

In an alternative embodiment of the present invention, the caller may be given the option of directly setting the playback speed. For example, the caller may be permitted to push "075," "150," or "125" indicating playback speeds of 0.075, 1.50, and 1.25×normal speed respectively.

Irrespective of how the choice of playback speed is indicated, the playback speed may be set such that it persists across sessions for a particular user mailbox. In such an embodiment, a user need not engage in options processing in each session.

The user may indicate responses to prompts by depressing a keypad button (to generate a DTMF signal), by speaking a response (and the use of Automatic Speech Recognition), or via some other signaling scheme.

Figure 6:
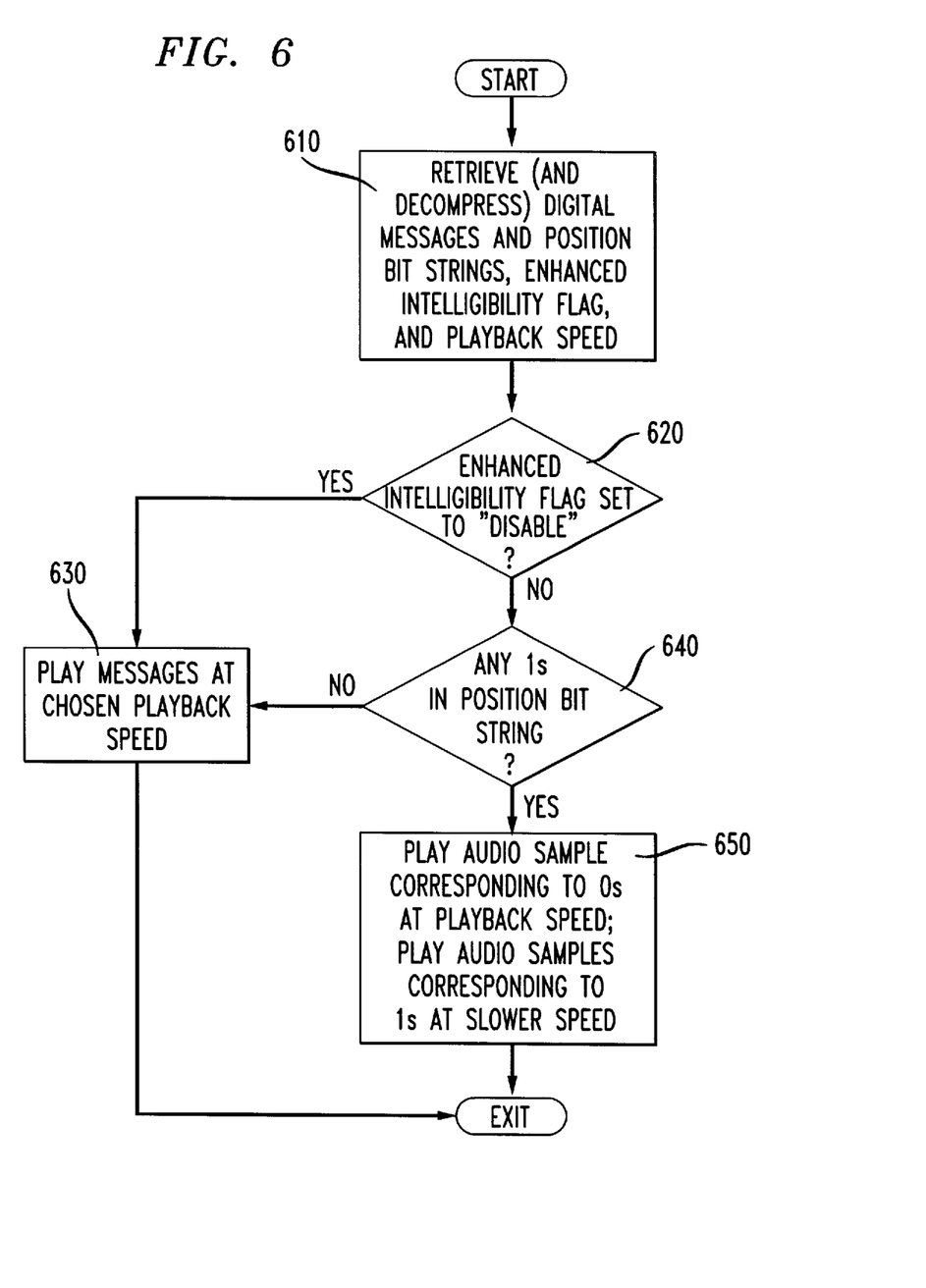
FIG. 6 is a flowchart of the processing and playback step of FIG. 2B.

Playback: The flowchart of FIG. 6 provides the details of the process and playback step 249 of FIG. 2B performed for each message. If a user chooses to play back a particular message (step 227), the messaging system 130 first retrieves the stored digital message signal and associated position bit string that were previously stored for that message (step 610). Additionally, the "enhanced intelligibility" flag and the stored playback speed for the caller are retrieved (step 610).

Next, the "enhanced intelligibility" flag is tested (step 620). If the "enhanced intelligibility" flag is set to "disable," then the entire message is decompressed, if compressed, and played to the caller through the audio unit 132 at the retrieved playback speed (step 630). U.S. Pat. No. 5,386,493 describes a method of playing back messages at slower or faster speeds without distorting pitch (eliminating, for example, the "chipmunk" effect when messages are played back at high speed).

If, however, the "enhanced intelligibility" flag is set to "enable," the position bit string is processed (step 640). Specifically, the processor 131 of the messaging system 130 analyzes the position bit string to determine whether the string includes any bits set to "1" (indicating the presence of spoken numbers in the message). If not, the entire message is decompressed, if compressed, and played to the caller through the audio unit 132 at the retrieved playback speed (step 630).

If the position bit string does include bits set to "1," the processor 131 causes the messaging system 130 to sequentially play back each of the audio samples, wherein the audio samples corresponding to the zeroes in the position bit string are played back through the audio unit 132 at the retrieved playback speed, while the audio samples corresponding to the ones are played back through the audio unit 132 at a speed slower than the retrieved playback speed (step 650). The slower speed may be, for example, a speed predetermined by the messaging system 131 (fixed or a function of some other parameter such as the retrieved playback speed), or, alternatively, may be set by the user. As "1s" and "0s" are encountered in the position string and as the speed of playback is correspondingly decreased and increased, the changes in speed may be accomplished using some taper function so that the effect is smooth and not jarring. For example, the speed may be gradually decreased or increased.

Other alternative embodiments: While the present invention has been particularly shown and described with reference to preferred embodiments thereof, it will be understood by those skilled in the art that various changes in form and details may be made therein without departing from the spirit and scope of the invention. For example, a digital message may be received and stored on storage device 135, and then processed at playback time in real time 131. This would require specialized circuitry and/or a messaging system 130 having a powerful processor (or multiple processors). When detection of embedded spoken numbers is accomplished for the first time during message playback, no positional information need be stored.

In the exemplary embodiment, detection of connected digits, connected numbers, or combinations of connected digits and numbers is accomplished before the message is compressed. However, the spoken numbers could be detected after a message is first compressed either by processing the message in compressed form or by processing it after decompression.

The present invention could also be incorporated into a home answering machine, provided that enough computational power is available (at least for the speech analysis portion of the system). A less powerful processor could be used if the message is processed in a batch mode.

What is claimed is:

1. A method for recording and playing a voice message, comprising the steps of:
   a) receiving the voice message;
   b) detecting at least one spoken number of interest, the at least one spoken number of interest being located at a variable position within the received voice message;
   c) recording the voice message on a storage device;

d) retrieving the voice message from the storage device;

e) playing a remaining portion of the message at a first speed, wherein the remaining portion of the message does not include the detected at least one spoken number of interest; and f) playing a spoken numeric portion of the message at a second speed, the spoken numeric portion including the detected at least one spoken number of interest wherein the second speed is slower than the first speed.

2. The method of claim 1 further comprising the steps of:

g) determining a position of the at least one spoken number of interest within the received voice message;

h) storing information related to the determined position on the storage device;

i) retrieving the stored information from the storage device; and j) performing steps e) and f) as a function of the retrieved information.

3. The method of claim 2 wherein the voice message includes a plurality of audio samples and wherein the information is stored as a string of bits, each of the plurality of bits being associated with at least one of the plurality of audio samples within the voice message.

4. The method of claim 1 wherein the spoken number of interest includes spoken connected numeric digits.

5. A method for playing back a voice message, comprising the steps of:

a) receiving the voice message;

b) detecting at least one spoken number of interest, the at least one spoken number of interest being located at a variable position within the received voice message;

c) playing a (first) remaining portion of the voice message at a first speed, wherein the remaining portion of the voice message does not include the detected at least one spoken number of interest; and d) playing a spoken numeric portion of the voice message at a second speed, the spoken numeric portion of the voice message including the detected at least one spoken number of interest, wherein the second speed is slower than the first speed.

6. The method of claim 5 further comprising the steps of:

e) determining a position of the at least one spoken number of interest within the received voice message;

f) generating a position signal as a function of the determined position; and g) performing steps c) and d) as a function of the position signal.

7. The method of claim 6 wherein the received voice message includes a plurality of audio samples and wherein the position signal is a plurality of bits, each of the plurality of bits being associated with at least one of the plurality of audio samples.

* * * * *